United States Patent
Mears et al.

(10) Patent No.: US 7,272,296 B2
(45) Date of Patent: Sep. 18, 2007

(54) NAVIGATING TO A PARTICULAR PROGRAM OR SPECIFIC TIME INCREMENT IN A PERSONAL VIDEO RECORDER

(75) Inventors: Mark Gilmore Mears, Zionsville, IN (US); Carolynn Rae Johnson, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1008 days.

(21) Appl. No.: 10/202,491

(22) Filed: Jul. 24, 2002

(65) Prior Publication Data

US 2004/0018000 A1    Jan. 29, 2004

(51) Int. Cl.
*H04N 5/76* (2006.01)
(52) U.S. Cl. .......................................... 386/68; 386/69
(58) Field of Classification Search .................... 386/1, 386/83, 116, 125; 348/906, 512, 513; 725/39, 725/55, 56, 92; 358/908, 909; 345/721, 345/720
See application file for complete search history.

(56) References Cited

U.S. PATENT DOCUMENTS

| | | | |
|---|---|---|---|
| 4,847,696 A * | 7/1989 | Matsumoto et al. .......... | 386/83 |
| 5,047,867 A | 9/1991 | Strubbe et al. ............. | 358/335 |
| 5,488,409 A | 1/1996 | Yuen et al. ..................... | 348/5 |
| 6,360,057 B1 * | 3/2002 | Tsumagari et al. ............ | 386/95 |
| 6,577,350 B1 * | 6/2003 | Proehl et al. ................ | 348/564 |
| 6,642,939 B1 * | 11/2003 | Vallone et al. .............. | 715/721 |
| 6,788,882 B1 * | 9/2004 | Geer et al. .................. | 386/116 |
| 7,152,209 B2 * | 12/2006 | Jojic et al. .................. | 715/720 |
| 2002/0012526 A1 * | 1/2002 | Sai et al. ...................... | 386/69 |

\* cited by examiner

*Primary Examiner*—Thai Q. Tran
*Assistant Examiner*—Gelek Topgyal
(74) *Attorney, Agent, or Firm*—Joseph J. Laks; Ronald H. Kurdyla; Joel M. Fogelson

(57) ABSTRACT

A method and a system for accessing recorded video programming, which can be displayed while the programming is being recorded to a storage medium (148). Program information can be automatically stored in a memory location. The program information can be determined by accessing an on-line program guide and monitoring a user video channel selection. The program information can include a program identifier (315) and a recording time (310). At least a portion of the program information can be displayed in a time-line (300) and sub-divided into a plurality of time increments (320, 325, 330). Responsive to a user input, playback of a portion of the programming corresponding to a user selection can begin. The user selection can be a selected portion of the program information that has been marked by the user. The user selection also can be identified by a recording time, which can include a start time and a stop time.

8 Claims, 3 Drawing Sheets

NAVIGATING TO A PARTICULAR PROGRAM OR SPECIFIC TIME INCREMENT IN A PERSONAL VIDEO RECORDER

BACKGROUND OF THE INVENTION

1. Technical Field

The present invention relates to the field of digital video recording, and more particularly to personal video recorder user interfaces.

2. Description of the Related Art

Modern day personal video recorders allow users to view a broadcast multimedia presentation on a delayed schedule, even while the broadcast still continues. After recording of the broadcasted multimedia presentation onto a storage medium is commenced, a user can begin playback of the recorded portion of the multimedia presentation. If a user chooses, he can pause playback of the multimedia presentation while the remainder of the multimedia presentation is still being recorded from the broadcast. The user then can commence playback of the multimedia presentation from where it was paused.

Some personal video recorders incorporate trick mode playback enabling a user to fast forward and rewind a recorded multimedia presentation. These systems are not convenient for accessing a particular portion of the presentation, however, because a user often must scan through a substantial amount of recording until a particular portion of the multimedia presentation is found. This is especially time consuming when a user wishes to skip from the end of a multimedia presentation back to the beginning, or from the beginning to the end.

Some personal video recorders provide an onscreen display that tracks a present location in the presentation as trick modes are performed on the presentation. The onscreen display is typically limited to a cursor displayed within a track. The position of the cursor within the track moves to reflect a present location within the presentation. However, the movement of the cursor is not adequate to precisely determine the present location within the presentation, nor to provide program information helpful to navigating through multiple presentations.

Other personal video recorders allow a user to bookmark a multimedia presentation where a user last stopped the presentation. Stopping the multimedia presentation whenever a user wishes to bookmark a particular sequence can also be inconvenient and, needless to say, irritating. Hence, bookmarking has limited use for finding a specific portion of a multimedia presentation. Further, bookmarks are typically erased after re-play of a multimedia presentation is commenced. Hence a user only can use the bookmark once to jump to a bookmarked portion of the multimedia presentation. After one use, a user typically must revert to rewinding and fast forwarding through the multimedia presentation in order to review the particular sequence again.

SUMMARY OF THE INVENTION

The present invention relates to a method and a system for accessing recorded video programming. The recorded video programming can be displayed while the programming is being recorded to a storage medium. Program information for each video program of the programming can be automatically stored in a memory location as well. The program information can be determined by accessing a program guide and monitoring a user video channel selection. The program guide can be provided from a myriad of sources.

For each video program the program information can include a program identifier and a recording time. Further, at least a portion of the program information for the programming that has been recorded can be displayed in a time-line and sub-divided into a plurality of time increments. Responsive to a user input, playback of a portion of the programming corresponding to a user selection can begin. The user selection can be a selected portion of the program information that has been marked by the user. In another arrangement the user selection can be identified by a recording time, which can include a start time and a stop time.

DETAILED DESCRIPTION

Figure 1:
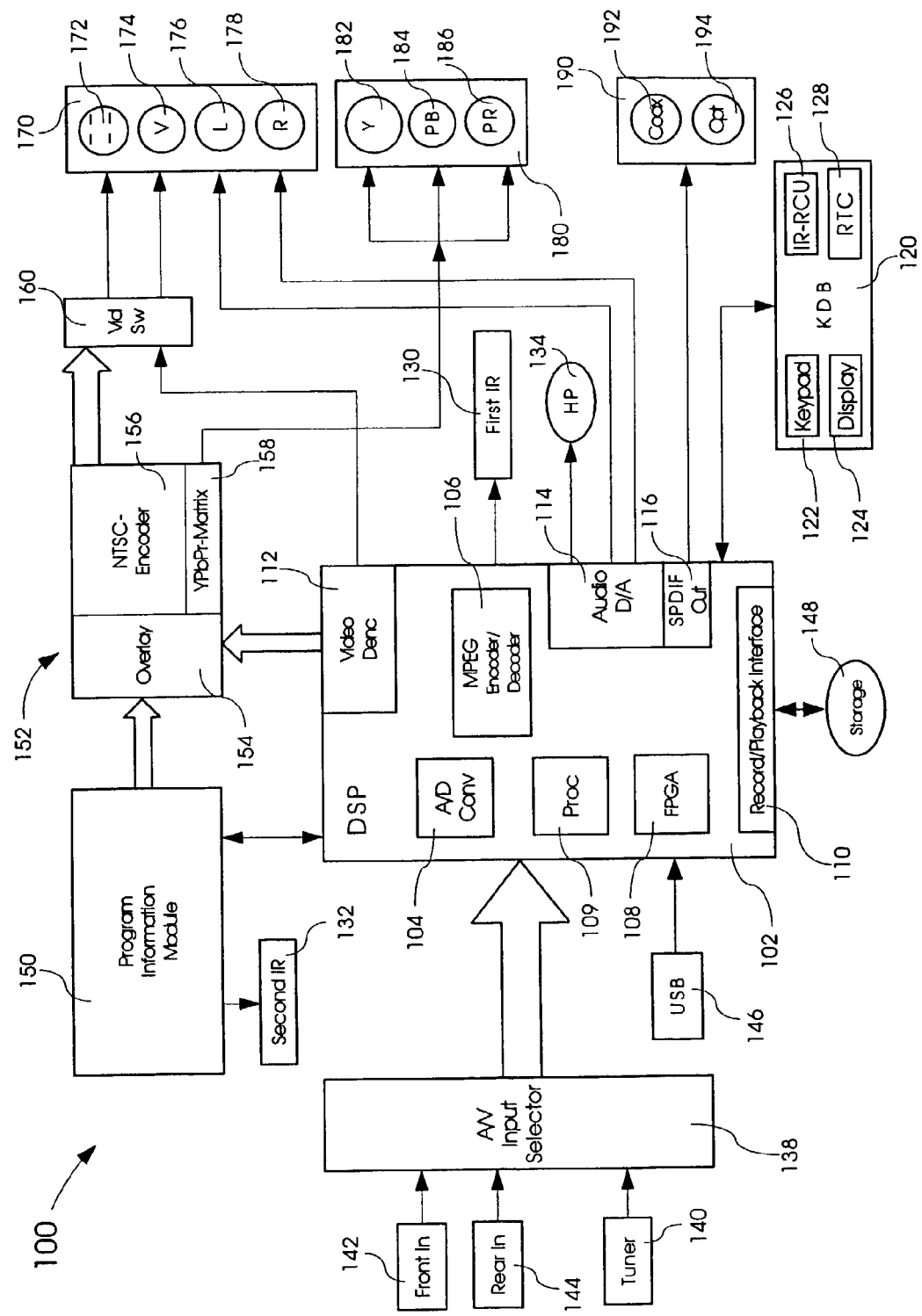
FIG. 1 is a block diagram of a personal video recorder incorporating navigation to a particular program or specific time increment within a video buffer in accordance with the present invention.

FIG. 1 is a block diagram of a personal video recorder (PVR) 100 incorporating means for navigating to a particular program or specific time increment within a video buffer. The personal video recorder 100 can include a digital signal processor (DSP) 102, a key and display board 120, a tuner 140, an A/V input selector 138, a USB input 146, a storage device 148 and a program information module 150. Additionally, the PVR 100 can include first and second infra-red (IR) links 130 and 132, a video overlay encoder 152, a video switch 160, a headphone jack 134, a standard A/V component connector block 170, a Y Pb Pr component connector block 180, and a Sony/Phillips digital interface (SPDIF) connector block 190.

The component connector blocks 170, 180 and 190 can provide audio/video signals in a variety of output formats. For example, the standard A/V component connector block 170 can comprise an S-video connector 172 for outputting to a video display video that has been separated into chrominance and luminance video signals and a composite video connector 174 for providing a standard composite video signal. Further, the standard A/V component connector block 170 can comprise left and right audio output connectors, 176 and 178, respectively.

The Y Pb Pr component connector block 180 is typically used for high definition television (HDTV). The Y Pb Pr component connector block 180 comprises a video luminance (Y) output connector 182 for providing an analog video luminance component, a Pb output connector 184 for providing an analog blue color difference (B−Y), and a Pr output connector 186 for providing an analog red color difference (R−Y). Lastly, the SPDIF component connector block 190 comprises a coaxial output 192 and an optical output 194 for outputting digital audio signals via a coaxial cable or fiber optic cable, respectively.

The key and display board 120 can be provided as a user interface for the PVR 100 and can incorporate a keypad 122, a display 124, an IR remote control interface 126 and a real time clock 128. By using the keypad 122 or the IR remote control interface 126, a user can select functions to be executed by the PVR 100. For example, a user can choose to change channels on the PVR 100 or to perform trick mode playback. The real time clock 128 can keep time, which can be shown by the display 124. The display 124 also can show other information as well, for example a trick mode being executed by the PVR 100, a selected channel being recorded by the PVR 100, or an identifier representative of a presentation being shown on a video display.

First and second IR links 130 and 132 form a set of communication links between satellite and non-satellite applications to help simplify the interface between the audio, video, and data streams. The first IR link 130 can be a communication interface between the DSP 102 and other devices having an IR communication link. Notably, the first IR link 130 can be useful for controlling other devices designed specifically for aired or cable television broadcasts or radio broadcasts using standard program guide information. The first IR link 130 also can enable features to simplify the consumer's interaction between devices. For example, the first IR link 130 can enable one touch program recording, as well as other user conveniences. The second IR link 132 can provide an interface between the program information module 150 and other devices having IR communication links. Significantly, the second IR link 132 can be useful for communicating with devices not requiring a direct connection to DSP 102, for example with a cable reception device, a VCR, etc.

Digital signal processor 102 can comprise an analog to digital (A/D) converter 104, an MPEG encoder/decoder 106, a field programmable gate array (FPGA) 108, a micro controller 109, a recorder/playback interface 110, a digital video processor/encoder 112, an audio digital to analog converter (audio D/A) 114 and a SPDIF output 116. The DSP 102 can further include one or more data busses enabling the different DSP components to communicate with each other and cooperatively process data. Notably, interrupt requests (IRQs) and direct memory addresses (DMAs) can be utilized to facilitate buss communications and data processing.

Audio/Video (A/V) input selector 138 can include a plurality of A/V inputs. For example, the input selector 138 can incorporate an A/V input to receive A/V signals from tuner 140. The input selector also can receive signals form various other input devices as well. For example, a video camera can send A/V signals to the input selector 138 via front A/V input 142, and a VCR can send A/V signals via rear A/V input 144. Significantly, other A/V devices can be connected to the A/V input selector 138 as well.

The A/V input selector 138 can forward the received A/V signals to DSP 102. The DSP's A/D converter 104 can be used to convert A/V signals received in an analog format to a digital format. A/V signals already in digital format can bypass the analog to digital conversion, for example, digital signals received via a universal serial bus (USB) interface 146.

Field programmable gate array 108 can provide instructions which are acted upon by controller 109 for processing data received from the A/V input selector 138 or the USB interface 146, depending on the type of data received. For example, if A/V data is received in an uncompressed form, FPGA 108 and controller 109 can control processing of A/V data by MPEG encoder/decoder 106 for MPEG compression prior to being sent to the record/playback interface 110. However, if A/V data is received in an MPEG compressed format, FPGA 108 and controller 109 can controllably couple the A/V data to the receive/playback interface 110. In either case the FPGA 108 can provide read/write instructions which are implemented by controller 109 and control record/playback interface 110, for storing the A/V data on buffer storage device 148.

MPEG encoder/decoder 106 can perform MPEG compression and decompression on digital A/V signals. For example, MPEG encoder/decoder 106 can receive digital A/V signals from A/D converter 104 or USB interface 146, compress the digital A/V signals using an MPEG format, and forward the compressed digital A/V signals to the receive/playback interface 110. The receive/playback interface 110 then can store the compressed digital A/V signals to storage 148.

Storage 148 can include one or more data storage devices. For example, a data storage device can be a magnetic storage medium, such hard disk drive (HDD), an optical storage medium, such as a digital video disk (DVD), an electronic storage medium, such as random access memory (RAM), a magneto/optical storage medium, or any combination of storage devices.

During playback the receive/playback interface 110 can read A/V data from storage 148. The A/V data then can be forwarded to MPEG encoder/decoder 106 for decompression. After decompression the A/V data can be separated into video and audio signals. The audio signal can be forwarded to SPDIF 116 to be output digitally via coaxial output 192 or optical output 194. The audio signal also can be forwarded to audio D/A converter 114 for D/A conversion. After D/A conversion the audio signal can be output via headphone jack 134 and/or left and right audio outputs 176 and 178.

The video signal can be processed by video digital encoder 112, which can perform D/A conversion on the video signal as well as encode the video signal into a variety formats. For example, the video signal can be encoded into an RGB format, separated into luminance and chrominance (Y+C) signals, or encoded as an NTSC composite video signal. The composite video and the Y+C video signals can be forwarded to video switch 160, while the RGB video signal can be forwarded to the video overlay encoder 152.

The video overlay encoder 152 can comprise overlay module 154, NTSC video encoder 156, and Y Pb Pr matrix encoder 158. The overlay module 154 can receive program information from a program information module 150 and graphically overlay the program information onto the video signal. The program information module 150 can extract the program information from a program guide. The program guide can be provided from a myriad of sources. For example, the program guide can be provided from an on-line source, a modem dialup connection, a pager network, etc. The program guide also can be contained in incoming A/V signals received by the A/V input selector 138 and communicated to the program information module 150 by the DSP 102.

The program information can include available programs for each channel as well as program scheduling. Further, for each individual program the program information can include a program identifier, channel information, recording time, program duration, scene data, program credits, etc. Other information and graphics may be overlaid onto the video signal as well. For example, a clock, text blocks, user information, menus, icons, pictures, etc. can be overlaid onto the video signal. Typically, information is overlaid onto the video signal when requested by a user or upon some pre-defined event. However, some information, such as a channel identifier, can be continually overlaid over the video signal.

The NTSC encoder can output the video signal as an NTSC formatted composite video signal, as well as video separated into separate luminance and chrominance signals. The video signals then can be forwarded the video switch 160. The video switch 160 can be used to select for display either the NTSC encoded video signal or the video signal generated by the video digital encoder 112. Composite video signals from either source can be output via composite video output connector 174, while chrominance and luminance video signals from either source can be output via the S-video output connector 172.

The Y Pb Pr matrix encoder 158 can generate a Y Pb Pr formatted analog video signal. As previously noted, the Y Pb Pr video signal includes a video luminance (Y) component, an analog blue color difference (B–Y), and an analog red color difference (R–Y). The Y component can be output to the Y output connector 182, the (B–Y) difference can be output to the Pb output connector 184 and the (R–Y) difference can be output to the Pr output connector 186.

Figure 2:
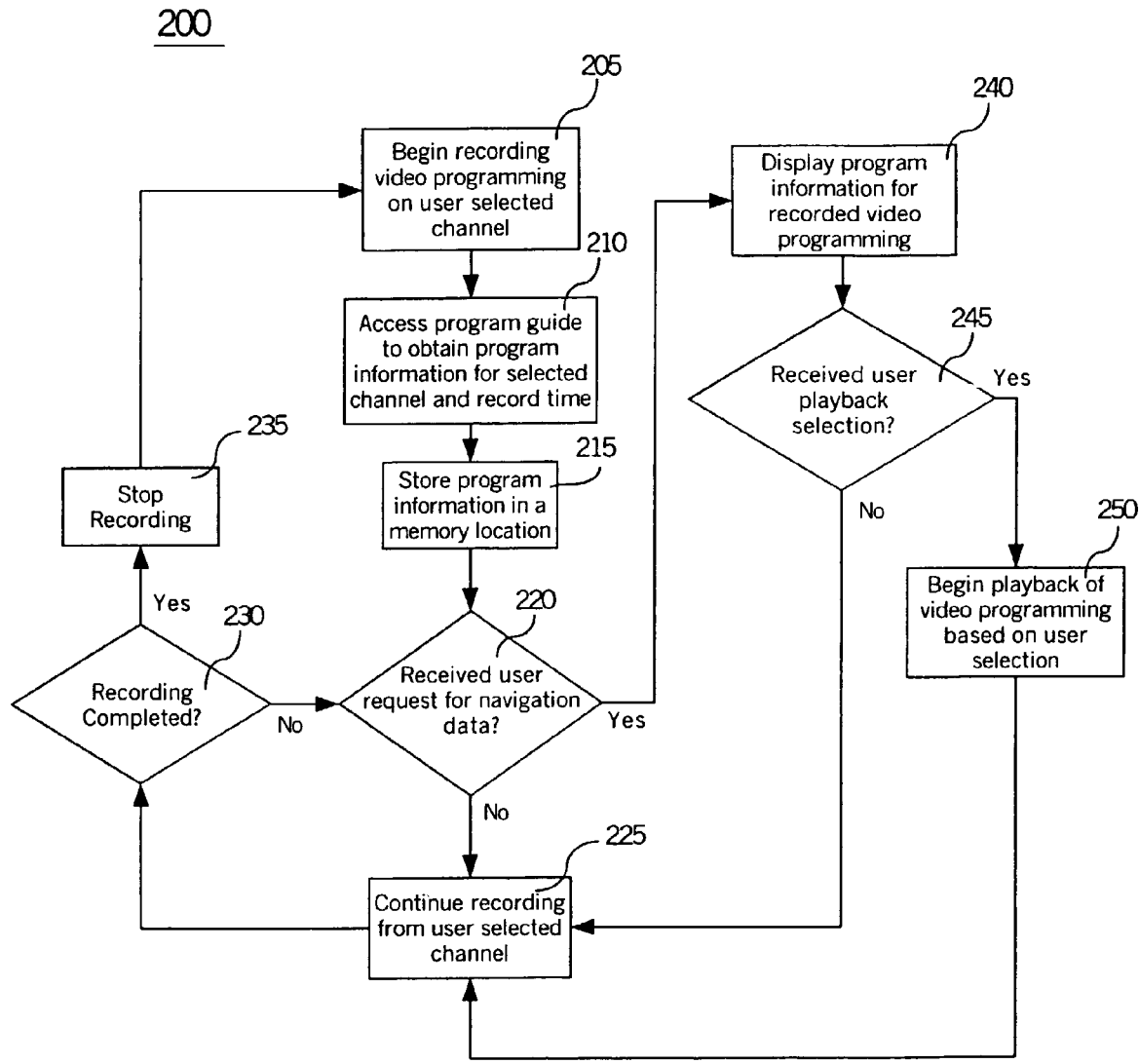
FIG. 2 is a flow chart showing the method of navigating to a particular program or specific time increment within a personal video recorder video buffer in accordance with the present invention.

FIG. 2 is a flow chart 200 illustrating a method of navigating to a particular program or specific time increment within a personal video recorder 100 video buffer. At step 205 the personal video recorder 100 can begin recording broadcast video programming (programming) on a user selected channel. The user can choose to make a permanent recording of the programming or to temporarily buffer the programming. In the case that that the user chooses to make a permanent recording of programming, the programming will not be overwritten until the user deletes it. If the programming is being temporarily buffered, the programming can be overwritten if the buffer becomes full. Generally, temporarily buffered programming can be overwritten in chronological order.

The user can select a channel via keypad 122 or a remote control unit communicating with the key and display board 120 via IR remote control interface 126. The A/V input 138 can select the appropriate input device based upon the user channel selection. For example, the channel selected by the user can be received via tuner 140, front input 142 or rear input 144. The selected channel then can be recorded to storage 148 and output to a video display via standard A/V component connector block 170, Y Pb Pr component connector block 180, and/or SPDIF connector block 190.

Referring to step 210, a program guide can be accessed to obtain program information for the selected channel and record time. As previously noted, program information such as a program identifier, channel identifier and recording time can be extracted from the program guide by the program information module 150. The recording time can be defined by a program start time and a program stop time. Additional program information can be provided as well, for example program credits, duration, scene information, etc. At step 215 the program information can be automatically stored in a memory location, such as storage 148. In one arrangement the program information can be stored on the same memory device as buffered A/V data. In another arrangement a separate memory device can be provided for the program information.

Recording of the programming can continue until the recording is completed, as shown in steps 225 and decision block 230, at which point the recording can be stopped, as shown in step 235. Referring to decision block 220 and step 240, upon a user request navigation data and program information for the recorded programming can be provided by the program information module 150 and output to a video display. If the user enters a playback selection, playback of a portion of the recorded programming corresponding to the user selection can begin, as shown in decision block 245 and step 250.

Figure 3:
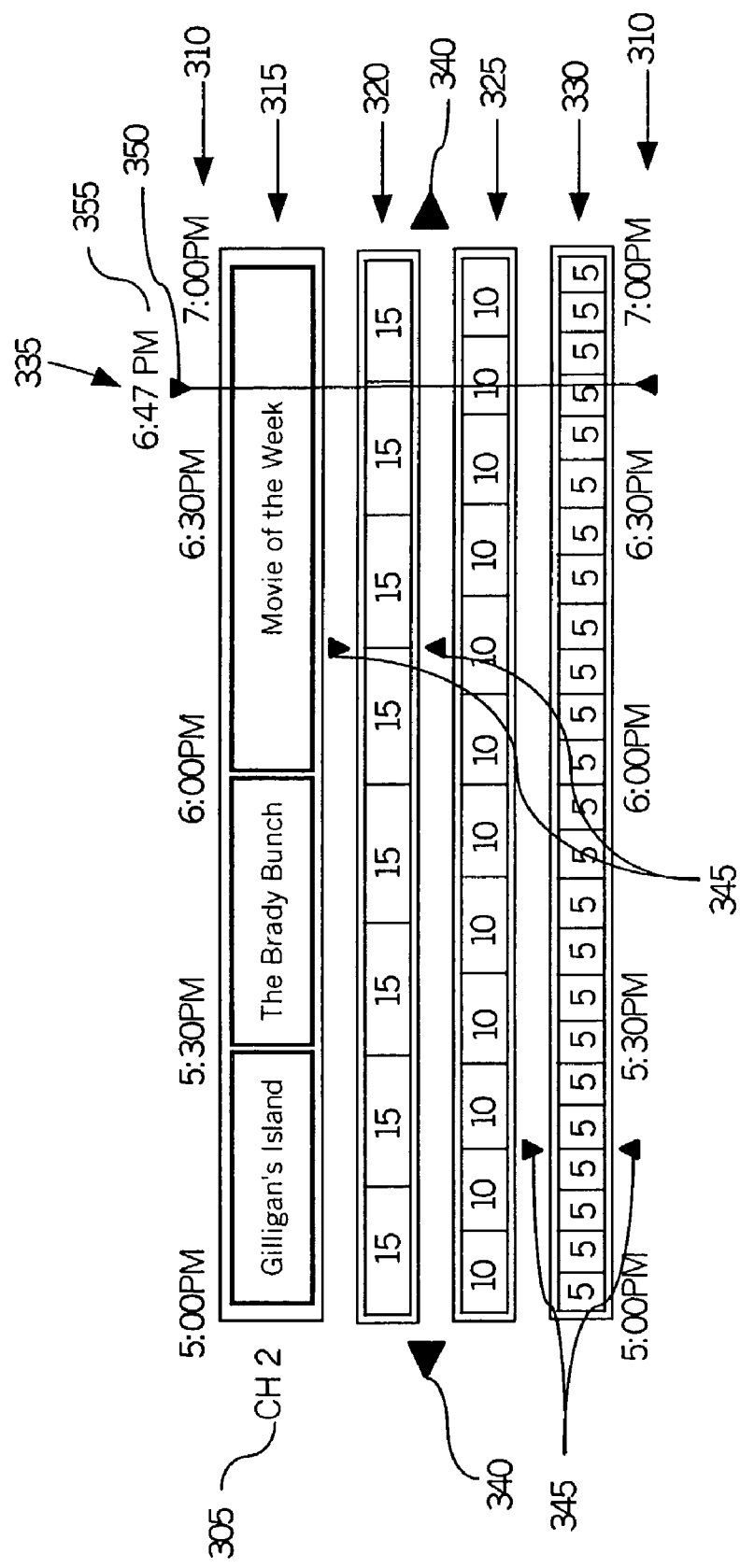
FIG. 3 is an exemplary depiction of a television onscreen display depicting program names and time interval selection in accordance with the present invention.

In one arrangement the program information for the recorded programming can be displayed in a time-line, for which an example is shown in FIG. 3. The time-line 300 can include a channel identifier 305, a time schedule 310, and a row of program selections 315. Further, the time-line 300 can include rows of time increments 320, 325 and 330. The time-line 300 also can include a current video indicator 335 that marks the current time-moment of the recorded presentation that is currently being played back, horizontal time increment cursor 340 and vertical time increment cursors 345.

In addition to displaying recorded program information in an easy to view format, the present invention provides the user numerous methods of navigating through recorded programming. Further, a plurality of viewing selection options can be provided as well. For example, in one operational mode the current video indicator 335 can track playback of the recorded programming by indicating the current time-moment within the recorded programming, both with a cursor 350 and time display 355. Playback can be tracked until a user input is received to move the current video indicator 335, which can effectuate control over playback of the recorded programming.

The user input can be received via keypad 122 or a remote control unit and can be communicated to the record/playback interface 110 as well as the overlay 154. The overlay can display movement of the current video indicator 335 onto the video signal being provided to the display. The record/playback interface 110 can change playback of the recorded programming in accordance with the user input. Playback then can re-commence at a frame that correlates to the time-moment where the user input moves current video indicator 335. The time display 355 can be updated with the new current time-moment within the recorded programming.

In another operational mode a user can manipulate horizontal time increment cursor 340 to select one of the rows of time increments 320-330 or the row of program selections 315. Accordingly, the user then can jump through the recorded programming to specific time increments correlating to the time increment row selected by the horizontal time increment cursor 340. For example, if the user selects the row of 10 minute time increments 325, the user can jump through the recorded programming at those 10 minute increments. The vertical time increment cursors 345 can mark the time increments selected by the user and playback of the recorded presentation can begin from that time-moment. If the user selects the row of program selections 315, the user can jump from the beginning of one presentation to the beginning of another. For example, if the user is viewing The Brady Bunch and realizes he has already seen that episode, the user can jump to the beginning of Gilligan's Island or to the beginning of the Movie of the Week.

It should be understood that recorded programming can also be tracked from different channels and the present invention contemplates user selection of programming among various channels. For example, multiple rows of channels being recorded can be illustrated or the channel indicator can be shown in each of the program selections in the row of program selections 315. In the example, one channel is shown for clarity. As previously discussed, the overlay 154 can reflect the user selections on the video display and the record/playback interface 110 can implement the correlating playback changes.

A user can jump between rows and time increments using keypad 122 or a remote control unit. For example, up and down arrows can be provided to select the desired row of time increments 320-330 or the row of program selections 315. Left and right arrows can be provided for jumping between time increments and between program selections. In the example provided above, a user watching the Brady Bunch can jump playback to the beginning of the Movie of the Week with a single push of a right arrow. A first push of a left arrow can jump playback back to the beginning of the Brady Bunch and a second push of the left arrow can jump playback back to the beginning of Gilligan's Island.

In yet another operational mode a user can enter a specific time in the recorded programming to commence playback. The specific time can be entered with a remote control unit or keypad 122. For example, a user can select the current video indicator 335 to update it with a new time. The current video indicator 335 can be displayed as highlighted to show that it has been selected. The remote control or the keypad 122 then can be used to enter the new time selection, such as 6:47 PM. In accordance with the user selection, the overlay can display the current video indicator 335 with the cursor 350 located at the time-moment of 6:47 PM and with the time display 355 showing 6:47 PM. Further, the record/playback interface 110 can change playback of the recorded programming so that playback commences at the new time of 6:47 PM.

In another arrangement a user can mark a time-moment in the recorded programming and this time-moment can be stored in memory, for example on storage 148. A user identifier can be provided with the time-moment mark to identify a particular location in a presentation where the user wishes to commence replay at a later time. In one embodiment each user can enter a plurality of time-moment marks and each user's marks can have an identifier associating those marks with the user. For example, each user can have his/her own color, number or letter identifier associated with the marks. In the case that a user only viewed a portion of the recorded programming, the portion of programming viewed can be identified with the user's identifier in the program selections 315. The time-moment marks and identifiers can be incorporated into the recorded program information so that it is available for display.

It should be understood that the examples and embodiments described herein are for illustrative purposes only and that various modifications or changes in light thereof can be suggested by persons skilled in the art and are to be included within the spirit and purview of this application. The invention can take many other specific forms without departing from the spirit or essential attributes thereof for an indication of the scope of the invention.

What is claimed is:

1. A method for playing recording video programming, characterized by the steps of:

displaying a first time line which is sub-divided into a first plurality of equal time length increments and a second time line which is sub-divided into a second plurality of equal time length increments wherein said first and second time lines are displayed at the same time, and the first plurality and second plurality of time increments are different time lengths;

playing back recorded programming from a storage medium, wherein when the first time line is selected, said programming is either jumped ahead or backwards by a time increment corresponding to said first time line in response to a user command, and playing back said recorded programming, wherein when the second time line is selected, said programming is either jumped ahead or backward by a time increment corresponding to said second time line in response to said command.

2. The method of claim 1, wherein a cursor is displayed relative to said first time line, if selected, or said second time line, if selected, corresponding to the time duration elapsed for said recorded programming.

3. The method of claim 1, wherein in response to a user command, a displayed cursor moves from said first time line to said second time line.

4. The method of claim 1, wherein either the first time line or the second time line is capable of being marked by a user command.

5. A video device comprising:

a storage medium that stores programming;

a memory location that stores information relation to said programming;

a user interface presenting a first time line which is sub-divided into a plurality of time increments of equal lengths and a second time line which is sub-divided into a second plurality of time increments of equal lengths, wherein said first and second time lines are displayed at the same time, and the plurality and second plurality of time increments are of different time lengths, wherein when said programming is played back, an amount of time said programming is either jumped ahead or backward, in response to a command, corresponds to the time length increment corresponding to a time line that is currently selected.

6. The apparatus of claim 5, wherein a cursor is displayed relative to said first time line, if selected, or said second time line, if selected, corresponding to the time duration elapsed for said recorded programming.

7. The apparatus of claim 5, wherein in response to a user command, a displayed cursor moves from said first time line to said second time line.

8. The apparatus of claim 5, wherein either the first time line or the second time line is capable of being marked by a user command.

* * * * *